(12) United States Patent
Hosono et al.

(10) Patent No.: US 6,409,958 B1
(45) Date of Patent: Jun. 25, 2002

(54) METHOD OF PRODUCING BIAXIALLY STRETCHED POLYESTER FILM

(75) Inventors: Yasuyuki Hosono; Masaaki Otoshi; Tadahiro Kegasawa; Fumitaka Terai; Kazuo Ozaki, all of Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/531,216

(22) Filed: Mar. 20, 2000

(30) Foreign Application Priority Data

Mar. 19, 1999 (JP) .............................. 11/074831

(51) Int. Cl.⁷ .............................. B29C 47/00

(52) U.S. Cl. .................. 264/466; 264/481; 264/210.7

(58) Field of Search .................. 264/466, 481, 264/210.5, 210.7, 235.8, 290.2

(56) References Cited

U.S. PATENT DOCUMENTS

| | | | | |
|---|---|---|---|---|
| 4,020,141 A | * | 4/1977 | Quinn et al. |
| 5,575,968 A | * | 11/1996 | Seo et al. |
| 5,753,172 A | * | 5/1998 | Forrest, Jr. et al. |
| 5,914,220 A | * | 6/1999 | Murayama |
| 5,993,958 A | * | 11/1999 | Okutsu |
| 6,036,905 A | * | 3/2000 | Park et al. |
| 6,221,301 B1 | * | 4/2001 | Tsunashima et al. |

* cited by examiner

*Primary Examiner*—Mark Eashoo
(74) *Attorney, Agent, or Firm*—Sughrue Mion, PLLC

(57) ABSTRACT

This invention provides a method of producing a biaxially stretched polyester film with regulating casting conditions of a polyester film at a high speed so as not to induce surface defects caused by entrapping air microbubbles between a cooling drum and a molten resin sheet, and regulating longitudinal stretching conditions and lateral stretching conditions. The biaxially stretched polyester film is excellent in small thickness variation, resistance to cleavage and improvement in bowing phenomenon, and is particularly suitable for the support of a photographic film.

6 Claims, 3 Drawing Sheets

METHOD OF PRODUCING BIAXIALLY STRETCHED POLYESTER FILM

BACKGROUND OF THE INVENTION

This invention relates to a method of producing a polyester film using the application of static electricity, and more particularly, relates to a method of producing a biaxially stretched polyester film with regulating casting conditions of a polyester film at a high speed so as not to induce surface defects caused by entrapping air microbubbles between a cooling drum and a molten resin sheet, and regulating longitudinal stretching conditions and lateral stretching conditions. The biaxially stretched polyester film is excellent in small thickness variation, resistance to cleavage and improvement in bowing phenomenon, and is particularly suitable for the support of a photographic film.

In a conventional method of producing a cast film by cooling rapidly to solidify a thermoplastic resin containing polyester reins, the application of static electricity is employed for adhering a sheet-shaped molten resin discharged from a die to a cooling drum (Japanese Patent KOKOKU 37-6142).

Besides, it is also disclosed in a reference "Kobunshi Jikken Gaku 5, Polycondensation and Polyaddition", Kyoritsu Shuppan, 1980 that a metal catalyst is necessary for the synthesis of a polyester, such as polyethylene terephthalate.

Incidentally, when film forming speed of a cast film is raised in the above application of static electricity system, air entrapping problem occurs between a molten resin sheet and a rotating cooling drum exceeding a critical speed. As a result, indentations are formed as traces of air-entrapped on the surface of cooled sheet.

A considerable solving means for raising the critical speed, at which air entrapping occurs, is to increase the content of metal catalyst. That is, by increasing the content of metal catalyst, the specific resistance of the molten resin sheet is lowered, and thereby, adhesion of the sheet to a cooling drum is improved upon applying static electricity to inhibit entrapping of air. However, the increase of metal catalyst content induces problem of tone change caused by thermal degradation and the generation of metallic agglomerates in the molten resin.

Therefore, cast film forming is carried out by determining allowable surface conditions for the use of each sheet previously, preparing an optimum recipe of resin composition, and casting the sheet at a speed lower than the critical speed. Particularly, in the field of requiring severe allowable level of foreign matters, such as photographic film, there is a limitation of metal catalyst content by itself, and various proposals have been made for film forming with harmonizing film forming speed with tone change and the generation of metallic agglomerates.

For example, Japanese Patent KOKAI 2-9688 discloses a method of forming a uniform polyethylene terephthalate film by controlling the specific resistance of the polyester in a melted state to 500,000 to 500,000,000 Ω·cm. However, according to this method, coloring occurred caused by thermal degradation in a small specific resistance region, i.e. when metal catalyst content is great, and air entrapping cannot be inhibited at a high speed in a large specific resistance region. Accordingly, a high speed film forming of a polyester film cannot be achieved for a photographic film.

Japanese Patent KOKAI 8-291216 discloses a method of inhibiting air entrapping by restricting the specific resistance of the polyester in a melted state to 1,000,000 to 10,000,000 Ω·cm narrower than the above method. This method is preferable for high speed film forming, but is insufficient in tone change problem and metallic agglomerates problem for a photographic film.

Japanese Patent KOKAI 61-219622 discloses a method of forming a thermoplastic polymer sheet which comprises extruding the thermoplastic polymer in sheet on the surface of a rotating cooling drum on which a liquid membrane layer has been applied to solidify (called water application system), wherein locating the die in front of the vertical plane containing the rotating shaft of the cooling drum, and tilting the discharge angle of the molten thermoplastic polymer from the die against the vertical plane to shorten the traveling distance of the extruded sheet from the die to the surface of the cooling drum. Japanese Patent KOKAI 61-237619 discloses a modification of the above method by providing an adjusting plate for sheet edge portion on both side ends of the discharge port, and a molten resin sheet immediately after discharging travels in a state that both sides of the sheet are in contact with the adjusting plate. However, the above film forming methods according to the water application system are difficult of setting water application conditions so that traces of water drops do not remain on the surface of sheet, and a precision controller is necessary for the films requiring severed allowable level of surface defects, such as a support for a photographic film. Moreover, when the discharge angle of a die is tilted as disclosed in Japanese Patent KOKAI 61-219622, 61-237619, it is difficult to place a heat bolt for adjusting lip clearance, and a working space for rough adjustment by hand must be set higher than the cooling drum.

As mentioned heretofore, by the prior art, a polyester film without problems of tone change, metallic agglomerates and the like and useful for a photographic film support cannot be produced stably at a high speed without surface defects, such as air entrapping.

Incidentally, films useful for a support for a photographic film are required to be resistant to cleavage as well as small thickness variation. There is a prior art to decrease thickness variation by regulating longitudinal stretching conditions, such as regulating stretching distance or force, multistep longitudinal stretching, regulating film crystallinity immediately before longitudinal stretching. However, some polyesters, such as polyethylene-2,6-naphthalene dicarboxylate, do not have a one to one relationship between stress and elongation, that is, there are two or more elongation types against an stress. As a result, uneven elongation tends to occur in the width direction and the traveling direction during stretching a polyester film.

This problem can be avoided by stretching the film until the region of one to one relationship between stress and elongation. For example, in the case of polyethylene-2,6-naphthalene dicarboxylate, a stretched film without uneven thickness, i.e. having a small thickness variation, can be produced by stretching at a longitudinal draw ratio of about 5 times. However, the stretched film stretched by a longitudinal draw ratio of about 5 times is liable to be cloven, and accordingly, it is unsuitable for the support of a photographic film. When a film having resistance to cleavage required as the support for a photographic film is produced, the longitudinal draw ratio must be less than 4 times. The films stretched under conventional conditions in this region have an uneven thickness.

That is, Japanese Patent KOKAI 60-178025 discloses a means for restricting uneven Young's modulus in the width direction and uneven thickness by setting the longitudinal stretching distance 30 to 800 mm and the stretching force 0.2 to 10 kg/mm². However, a polyethylene-2,6-naphthalene dicarboxylate film with a small uneven thickness cannot be obtained only by the means.

Japanese Patent KOKOKU 7-71821 discloses a means for obtaining a polyester being excellent in uniform thickness by stretching longitudinally in multiple step. However, films obtained by stretching a total longitudinal draw ratio of 4.0 times or more are insufficient in the resistance to cleavage required as the support for a photographic film, and breakage occurs during processing in the subsequent processes.

Japanese Patent KOKAI 6-210719 discloses a means for restricting uneven thickness by restricting crystallinity of a film immediately before longitudinal stretching to 0.5 to 20%, and a means for crystallization is a preliminary stretching, i.e. the longitudinal stretching is divided into two steps, and the first stretching is carried out at a draw ratio of 1.2 to 2.5 times. However, even adjusting the crystallinity of a film to 0.5 to 25%, in the case of a total longitudinal draw ratio of less than 4.0 times, stretched films with a small uneven thickness cannot be obtained by the means.

As explained above, by the prior art, both of resistance to cleavage and small uneven thickness cannot be satisfied simultaneously.

Moreover, polyester films useful for the support for a photographic film are required to have a small bowing phenomenon.

The bowing is defined and evaluated by drawing a straight line in the width direction of a longitudinally stretched film at the entrance of a tenter, and measuring the bowed degree, i.e. the distance between the top of the bowed line and the straight line connected both sides of the film (C in FIG. 6) per the width of the film (W in FIG. 6) at the exit of the tenter. The less the bowing is, the less the distribution of properties in the width direction is, and accordingly, is preferable for the support for a photographic film. It is considered that the bowing phenomenon is due to the distribution of molecular orientation in the width direction occurring caused by the thermal shrinkage at the central portion which is not fixed by a clip during the process of stretching a longitudinally stretched film laterally by a tenter.

Some trials were made for decreasing the bowing, such as by providing an intermediate cooling zone having a length of the film width or more between the stretching zone and the heat setting zone, by cooling to the glass transition point or lower than that in the intermediate cooling zone, restretching in the cooling process, and relaxing in the lateral direction in the cooling process, or the like. However, these technics are insufficient, because there is a region where the bowing phenomenon cannot be improved according to the type of resin, conditions, such as speed, or the like.

That is the method disclosed in Japanese Patent KOKAI 3-193328 was made for the purpose of improving the bowing which comprises providing an intermediate zone having a length of the film width or more between the stretching zone and the heat setting zone, and cooling the film to the glass transition temperature or less. However, according to this method, the improvement in the bowing was not exhibited in the case of polyethylene-2,6-naphthalate film.

Japanese Patent KOKAI 3-216326 and 4-142916-8 disclose some modifications of the above method, such as restretching in the cooling process, relaxing in the lateral direction in the cooling process or the like. However, these methods were also not effective for the improvement in the bowing as to polyethylene-2,6-naphthalate film.

Moreover, the above methods are difficient in the care for raising a film forming speed, such as cooling conditions, and are inferior in generality.

Japanese Patent KOKAI 3-193329 and 3-207632 disclose the modification of the above method which provides nip rolls in the intermediate zone. However, nip rolls tend to generate abrasion and lateral unevenness, and therefore, the method is not suitable for the production of a support for a photographic film.

As mentioned above, by the prior art, a film for a support for a photographic film having a small bowing phenomenon cannot be supplied stably even varying film forming speed.

As explained heretofore, although various technics for producing polyester film have been developed, it is not possible to produce a polyester film having no problem of tone change, metallic agglomerates and the like stably at a high speed without generating surface defects, such as air entrapping. Moreover, it is not possible to satisfy both of resistance to cleavage and small uneven thickness, nor possible to supply stably a polyester film having a small bowing phenomenon even varying film forming speed.

SUMMARY OF THE INVENTION

An object of the invention is to provide a method of producing a biaxially stretched polyester film, capable of forming a cast film having stable surface conditions in a region of higher casting speed than the conventional method without inducing tone change and metallic agglomerates caused by thermal degradation, and producing stably the biaxially stretched polyester film being excellent in resistance to cleavage, small thickness variation and small bowing phenomenon even varying film forming speed.

The inventors investigated eagerly in order to solve the above problems, and devised a method which has achieved the above object, wherein restricting electrostatic resistance (quantity of blended metal catalyst) of the resin to be used and setting the die in a prescribed range in the casting process of the cast polyester film, rendering the longitudinal stretching process into two step stretching under the restricted conditions of position relations, such as the gap between far infrared heater(s) and stretching roll(s) and restricted stretching conditions, such as draw ratio in each stretching process, and restricting tenter conditions, such as stretching temperature in the tenter, temperature of intermediate zones, passing time and heat setting temperature.

Thus, the present invention provides a method of producing a biaxially stretched polyester film which comprises casting a polyester cast film by extruding a molten polyester resin onto a cooling drum through a die while static electricity is applied to the extruded molten polyester resin, stretching the cast film in the longitudinal direction by stretching rolls, stretching the longitudinally stretched cast film in the lateral direction by a tenter, and heat setting the biaxially stretched cast film, wherein said molten polyester resin having been adjusted so as to have a specific resistance of $5 \times 10^6$ to $3 \times 10^8$ $\Omega \cdot$cm, said die being positioned so that the line connecting the center of the cooling drum and the intersection of the vertical line passing the die lip with the circumferential surface of the cooling drum has an angle of 30 to 90 degrees against the vertical line passing the center of the drum, said stretching in the longitudinal direction comprising a first longitudinal stretching and a second longitudinal stretching, each with heating by a far infrared heater, wherein stretching rolls in each stretching are located with a gap of 3 to 40 mm, and each far infrared heater is located with a gap of 5 to 40 mm from the circumferential surface of the stretching roll, wherein the cast film being stretched at a draw ratio of 1.05 to 1.5 times in the first longitudinal stretching, being cooled to glass transition temperature or lower, and then being stretched again so that the total draw ratio becomes 2.5 to 3.9 times in the second longitudinal stretching, said stretching in the lateral direction being carried out at a temperature in the range from glass transition temperature to the glass transition temperature +50° C., passing the laterally stretched cast film through an intermediate zone kept at a temperature from the surface temperature of the cast film at the end of the lateral stretching +20° C. to the maximum temperature of the surface temperature of the cast film in the tenter −20° C. for 3 to 30 seconds, and said heat setting being carried out at a temperature from melting point −30° C. to melting point −5° C.

Figure 1:
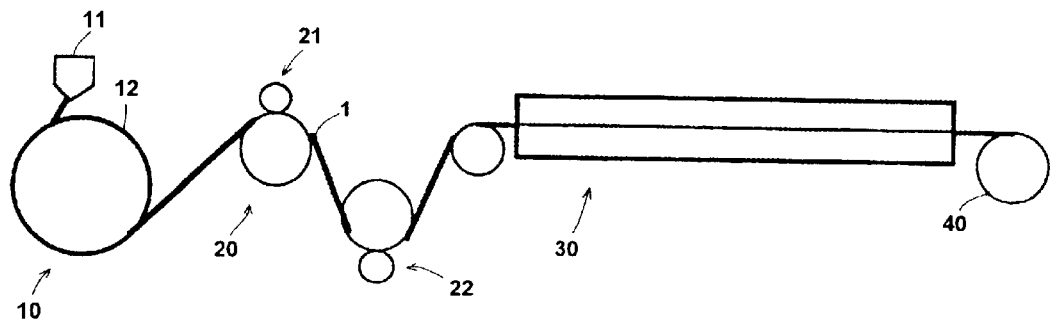
FIG. 1 is a schematic side view of a polyester film manufacturing apparatus.

1 . . . Polyester film
10 . . . Casting portion
11 . . . Die
12 . . . Cooling drum
20 . . . Longitudinal stretching machine
21 . . . First step longitudinal stretching machine
22 . . . Second step longitudinal stretching machine
23 . . . Heating stretching roll
24 . . . Cooling stretching roll
25 . . . Far infrared heater
26 . . . Temperature control pass roll
30 . . . Tenter
31 . . . Wind intercepting curtain
40 . . . Winder
O . . . Center of cooling drum
A . . . Top of cooling drum
B . . . Intersection
α . . . Angle of ∠AOB
S . . . Air gap
δ . . . Gap between far infrared heater and stretching roll
h . . . Gap between stretching rolls
X . . . Measuring position of cooling temperature of polyester film
W . . . Film width
C . . . Bowed degree

DETAILED DESCRIPTION OF THE INVENTION

The polyester is a polymer produced by the polycondensation of a diol and a dicarboxylic acid. Representative dicarboxylic acids are terephthalic acid, isophthalic acid, phthalic acid, naphthalene dicarboxylic acid, adipic acid, sebacic acid, and the like, and representative diols are ethylene glycol, triethylene glycol, tetramethylene glycol, cyclohexane dimethanol, and the like. Illustrative of the polyesters are polyethylene terephthalate, polytetramethylene terephthalate, polyethylene-p-oxybenzoate, poly-1,4-cyclohexylenedimethylene terephthalate, polyethylene-2,6-naphthalene dicarboxylate, and the like. The polyester includes homopolymer, copolymer and blend. Illustrative of comonomers are diethylene glycol, neopentyl glycol and polyalkylene glycol for the diol component, and adipic acid, sebacic acid, phthalic acid, isophthalic acid and 2,6-naphthalene dicarboxylic acid for the carboxylic acid component.

In the production of the polyester resin, each known catalyst can be used for esterification and ester exchange reaction. Although the esterification proceeds without a catalyst, the ester exchange reaction requires a lot of time while thermal degradation proceeds by staying the polymer in high temperature circumstances. Thereupon, the ester exchange reaction can proceed efficiently by adding the following catalyst.

As the catalyst of the ester exchange reaction, there are manganese acetate, manganese acetate 4 hydrates, cobalt acetate, magnesium acetate, magnesium acetate 4 hydrates, calcium acetate, cadmium acetate, zinc acetate, zinc acetate 2 hydrates, lead acetate, magnesium oxide, lead oxide and the like. Two or more of the catalysts may be combined.

In the method of the invention, the specific resistance of the melt-extruded polyester resin has been adjusted to $5 \times 10^6$ to $3 \times 10^8$ Ω·cm. When the specific resistance is made less than $5 \times 10^6$ Ω·cm, resin is yellowed, and the generation of foreign matters increases. When the specific resistance is more than $3 \times 10^6$ Ω·cm, air entrapping increases to induce indentations on the film surface.

The specific resistance of the polyester resin is adjusted by controlling the content of the above metal compound catalyst. In general, when the content of the metal compound catalyst increases, the ester exchange reaction proceeds faster, and the specific resistance is smaller. However, when the content of the metal compound catalyst is too great, the metal compound catalyst cannot be dissolved uniformly in the polymer to generate agglomerates which become foreign matter.

The polyester may contain phosphoric acid, phosphorous acid, esters thereof and inorganic particles, such as silica, kaolin, calcium carbonate, titanium dioxide, barium sulfate, and alumina in the polymerization step, and inorganic particles as above and the like may be blended therewith after the polymerization. The polyester may contain other additives, such as heat stabilizer, antioxidant, antistatic agent, lubricant, UV absorber, fluorescent brightening agent, pigment, light shielding material, filler, flame retardant, and the like.

The processes of the method of the invention are explained with reference to drawings.

FIG. 1 illustrates the construction of a polyester film manufacturing apparatus which consists of a casting portion 10 where a polyester cast film is formed, a longitudinal stretching machine 20 which stretches the cast film formed in the casting portion 10 in the longitudinal direction, a tenter 30 which stretches the longitudinally stretched cast film in the lateral direction, and a winder 40 which winds the biaxially stretched polyester film thus produced. The casting portion 10 has a die 11 and a cooling drum 12, and the longitudinal stretching machine 20 comprises a first step longitudinal stretching machine 21 and a second step longitudinal stretching machine 22.

In the casting portion 10, the polyester resin which has been sufficiently dried is heated to melt at a temperature of the melting point +10° C. to the melting point +50° C., and extruded in a sheet shape by an extruder through a filter and the die 11. The extruded polyester resin sheet is cooled to solidify on the rotating cooling drum 12. The die 11 is set at a position in the range of the angle α of 30 to 90 degrees, preferably 45 to 60 degrees, from the vertical plane containing the center of the rotating shaft of the cooling drum in its rotating direction. The angle α is ∠AOB wherein O is the center of the rotating shaft of the cooling drum, A is the for of the circumferential surface of the cooling drum, and B is the intersection of the vertical line drawn downward from the die lip and the circumferential surface of the cooling drum. When the angle α is less than 30 degrees, air entrapping increases to generate indentations on the film surface. On the other hand, the maximum angle a, is essentially 90 degrees from its definition.

Figure 2:
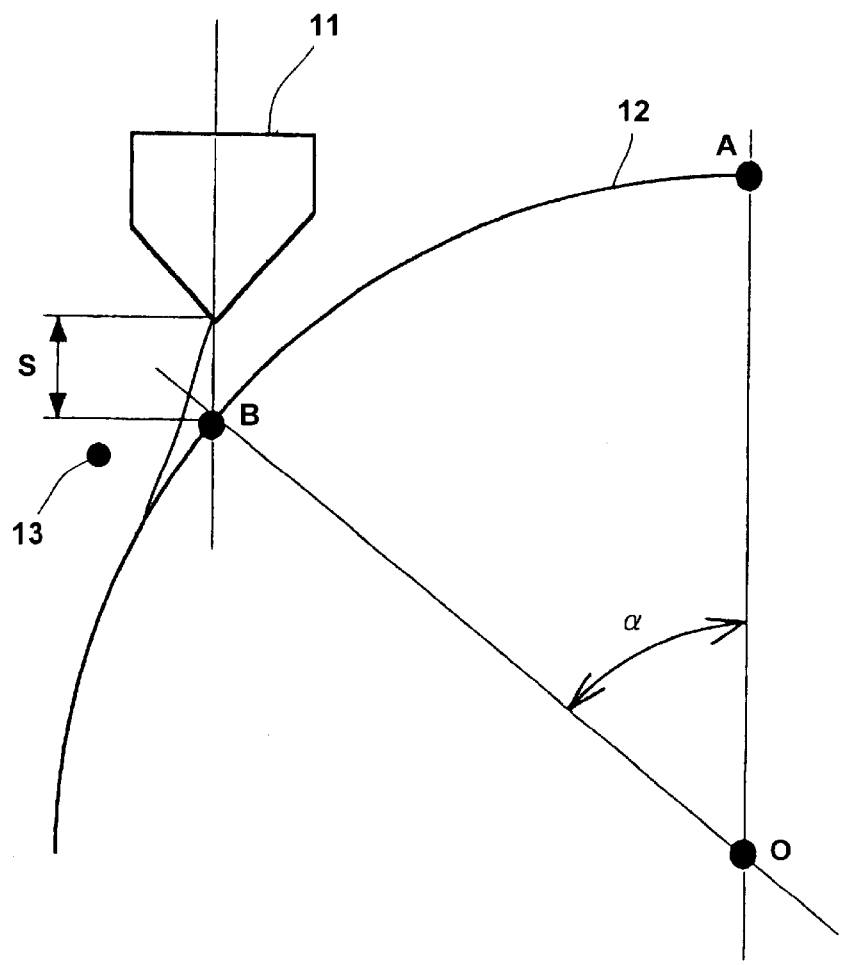
FIG. 2 is an enlarged schematic partial side view of the cooling drum which illustrates the angle α.

The angle α is further explained with reference to FIG. 2. In the FIG, 11 is the die, 12 is the cooling drum. The center of the rotating shaft of the rotating shaft is O, the point of the circumferential surface of the cooling drum 12 just above the center O is A, and the intersection of the vertical line drawn downward from the lip of the die 11 with the circumferential surface of the cooling drum 12 is 13. The sign S in the figure is air gap.

In the above apparatus, a static electricity applicator 13, such as a wire pinning, is set at the upper side of the sheet-shaped molten resin extruded from the die 11 (opposite to the cooling drum 12), and a high voltage of 10 to 30 kV is applied to the molten resin sheet to force adhering the molten resin sheet to the cooling drum 12. The molten resin sheet is rapidly cooled to solidify on the cooling drum to form a cast polyester film. The cast film is delivered to the longitudinal stretching process.

Figure 3:
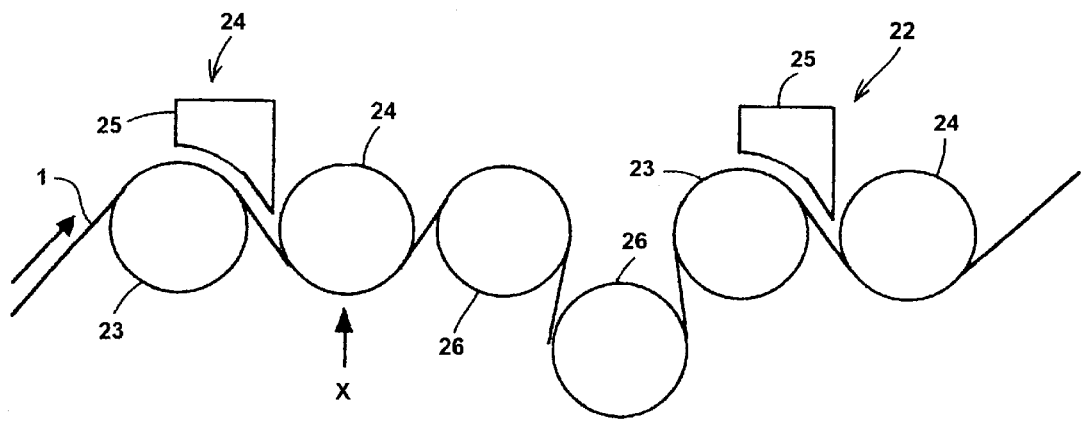
FIG. 3 is a schematic side view of the longitudinal stretching machine.

The longitudinal stretching process is explained with reference to FIG. 3. In the FIG, 21 is a first step longitudinal stretching machine (first longitudinal stretching), 22 is a second step longitudinal stretching machine (second longitudinal stretching). Each of the stretching machines 21, 22 consists of a heating stretching roll 23 and a cooling stretching roll 24 having a circumferential speed different from each other, and the heating stretching roll 23 is provided with a far infrared heater 25 above it. A temperature control pass roll 25 is provided between the first step longitudinal stretching machine 21 and the second step longitudinal stretching machine 22. In the figure, X indicates the position measuring the temperature of the polyester film 1 upon cooling the longitudinally stretched polyester film in the first longitudinal stretching to the glass transition point or lower than that.

In the longitudinal stretching process, the far infrared heater 25 is set so as to have a gap between the heating stretching roll 23 of 5 to 40 mm, and the cooling stretching roll 24 is set so as to have a gap between the heating stretching roll 23 of 3 to 40 mm. The cast film is stretched at a draw ratio of 1.05 to 1.5 times in the first longitudinal stretching, then cooled to the glass transition temperature or lower than that, and further stretched in the second longitudinal stretching so that the total draw ratio becomes 2.5 to 3.9 times.

Figure 4:
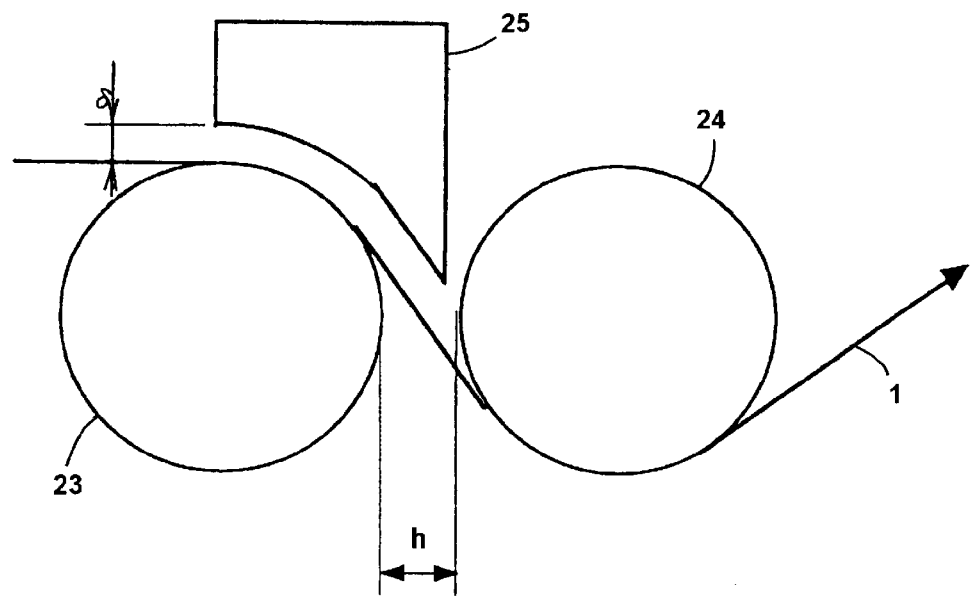
FIG. 4 is an enlarged schematic partial side view of the first step longitudinal stretching machine (the second step longitudinal stretching machine is similar).

The gap δ between the heating stretching roll 23 and the far infrared heater 25 and the gap h between the stretching rolls 23, 24 are explained with reference to FIG. 4. The gap δ between the heating stretching roll 23 and the far infrared heater 25 is 5 to 40 mm, preferably 10 to 30 mm. When the gap δ is smaller than 5 mm, partial melt adhesion of the polyester film to the roll surface occurs. When the gap δ is greater than 40 mm, heating efficiency is degraded at side portions compared with the central portion of the polyester film to induce uneven elongation, i.e. to induce uneven thickness. The gap h between the stretching rolls 23, 24 is 3 to 40 mm, preferably 10 to 30 mm. When the gap h is smaller than 3 mm, production stability is degraded, such the occurrence of abrasion. When the gap h is greater than 40 mm, waving occurs at edge portions by the increase of neck-in upon stretching, and uneven elongation occurs, i.e. thickness variation is degraded.

In the first longitudinal stretching, the cast polyester film is stretched at a draw ratio of 1.05 to 1.5 times, preferably 1.1 to 1.3 times. When the draw ratio is less than 1.05 ties, the effects by dividing into two steps are small to increase the degree of uneven thickness. When the draw ratio is more than 1.5 times, a considerable uneven elongation has already occurred in the first longitudinal stretching, and as a result, the uneven thickness of the longitudinally stretched polyester film after the second longitudinal stretching.

After the first longitudinal stretching, the polyester film is once cooled to the glass transition temperature (Tg) or lower than that. When the polyester film is cooled only to a temperature higher than the glass transition temperature (Tg), uneven elongation occurs between the cooling stretching roll 24 in the first longitudinal stretching and the heating stretching roll 23 in the second longitudinal stretching to induce uneven thickness. Although the lower end of the cooling temperature is not restricted, since the polyester film must be heated again to higher than glass transition temperature (Tg) until the second longitudinal stretching, an extremely low temperature is undesirable in cost.

In the second longitudinal stretching, the stretching is carried out so that the total draw ratio becomes 2.5 to 3.9 times. When the total draw ratio is less than 2.5 times, uneven thickness is great. When the total draw ratio is more than 3.9 times, the film is delivered to the lateral stretching process.

Figure 5:
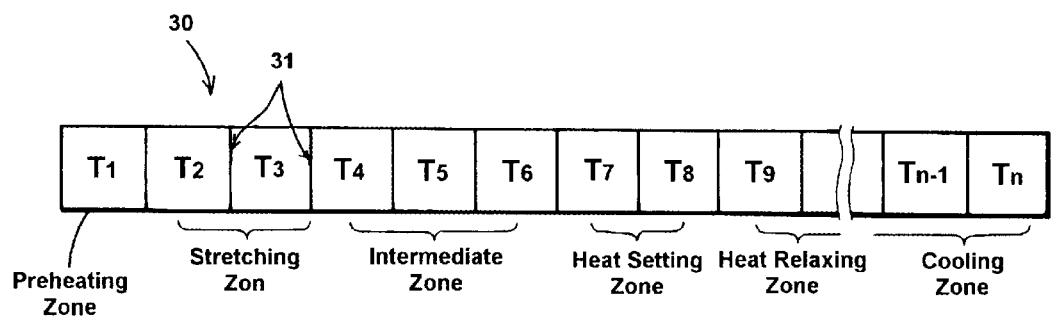
FIG. 5 is a schematic view illustrating zone construction of the tenter.

The lateral stretching process is explained with reference to FIG. 5. In the FIG, 30 is a tenter which consists of a preheating zone $T_1$, lateral stretching zones $T_2$, $T_3$, intermediate zones (gradual temperature elevation zones) $T_4$, $T_5$, $T_6$, heat setting zones $T_7$, T8, heat relaxing zones $T_9$–$T_{n-3}$, and cooling zones $T_{n-2}$–$T_n$ from the entrance, each divided by a wind intercepting curtain 31 and being temperature-controllable individually. The heat relaxing zones and cooling zones are not essential, and are provided optionally.

In the lateral stretching process, the longitudinally stretched film is introduced into the tenter, and laterally stretched in the lateral stretching zones at a temperature in the range from the glass transition temperature (Tg) to the glass transition temperature (Tg) +50° C. The laterally stretched polyester film enters the intermediate zones where temperature is controlled in the range from the lateral stretching temperature (the surface temperature of the polyester film at the final stretching zone) +20° C. to the heat setting temperature (the maximum temperature of the polyester film surface in the tenter) −20° C., passes there in a period from 3 to 30 seconds. The polyester film then enters the heat setting zones and heat-set there at a temperature in the range from the meting point (Tm) −30° C. to the melting point (Tm) −5° C.

In the lateral stretching zone, the longitudinally stretched film is stretched laterally at a temperature in the range from the glass transition temperature (Tg) to the glass transition temperature (Tg) +50° C., preferably from Tg +25° C. to Tg +45° C. When the lateral stretching temperature is lower than Tg, rupture occurs during stretching. When the lateral stretching temperature is higher than Tg +50° C., uneven elongation occurs in the lateral direction. A suitable lateral draw ratio in the lateral stretching zone is 3.0 to 4.2 times. When the lateral draw ratio is less than 3.0 times or more than 4.2 times, uneven thickness occurs.

After stretching the polyester film laterally, the polyester film is passed through the intermediate zone in a period from 3 seconds to 30 seconds where the temperature is controlled in the range from the lateral stretching temperature +20° C. to the heat setting temperature −20° C., preferably the temperature descending crystallization temperature (Tc) ±20° C. When the intermediate zone temperature is less than the lateral stretching temperature +20° C., the relaxation of strain energy of molecules accumulated in the film upon finishing lateral stretching is small. As a result, shrinkage stress of the polyester film works strongly on the central portion which is not fixed by clips in the heat setting zones to induce the bowing phenomenon greatly. On the other hand, when the intermediate zone temperature exceeds the heat setting temperature −20° C., heat shrinkage occurs at the intermediate zones to shrink at the central portion which is not fixed by clips to induce the bowing phenomenon greatly. When the passing time of the intermediate zones is no less than 3 seconds, the relaxation of strain energy of molecules accumulated in the film upon finishing lateral stretching is small. As a result, shrinkage stress of the polyester film works strongly on the central portion which is not fixed by clips in the heat setting zones to induce the bowing phenomenon greatly. On the other hand, a long passing time influences small on the performance of the polyester film. However, long intermediate zone increases equipment cost.

After passing the polyester film through the intermediate zones, heat setting is carried out in the heat setting zones at a temperature from the melting point (Tm) −30° C. to the melting point (Tm) −5° C. When the heat setting temperature is lower than Tm −30° C., the polyester film is liable to cleave. As a result, the polyester film is broken in the subsequent processes for processing it as the support for a photographic film. On the other hand, when the heat setting temperature exceeds Tm −5° C., partial sagging occurs during conveying to induce abrasions.

Through the above processes, biaxially stretched films produced are excellent in resistance cleavage, small uneven thickness and small bowing phenomenon, and are useful for the support for a photographic film. The biaxially stretched film is taken up by a winder.

EXAMPLES

Example 1

A polyethylene-2,6-naphthalene dicarboxylate resin was produced by using magnesium acetate 4 hydrates as the ester exchange catalyst in an amount of 60 ppm as the weight of magnesium atom per the weight of the polyester. The specific resistance of the resin upon melting was $10^8$ Ω·cm.

The above polyethylene-2,6-naphthalene dicarboxylate resin was melted, and extruded from the die having a lip width of 500 mm positioned at an angle α of 45 degrees onto the cooling drum (surface temperature: 50° C.) 1 m in diameter rotating at 20 m/min to form a cast film 450 mm in width 1 mm in thickness.

In the cast film, air entrapping and foreign matters of 50 μm or more were not generated.

Example 2

A cast film was produced under the same conditions as Example 1, except that the position of the die was set at an angle α of 30 degrees (air gap: 50 mm).

No foreign matters of 50 μm or more were generated, and air entrapping was inhibited at the limit.

Example 3

A cast film was produced under the same conditions as Example 1, except that the position of the die was set at an angle α of 90 degrees (air gap: 120 mm).

No foreign matters of 50 μm or more nor air entrapping were generated. However, neck-in was slightly great, and the film width was 400 mm.

Example 4

A cast film was produced under the same conditions as Example 1, except that the magnesium content was made 105 ppm. The specific resistance of the resin upon melting was $5 \times 10^6$ Ω·cm.

Air entrapping did not occur, but foreign matters of 50 μm or more were generated at a rate of 1 to 5 pieces per 1 m².

Example 5

A cast film was produced under the same conditions as Example 1, except that the magnesium content was made 40 ppm. The specific resistance of the resin upon melting was $3 \times 10^8$ Ω·cm.

No foreign matters of 50 μm or more were generated, and air entrapping was inhibited at the limit.

Comparative Example 1

A cast film was produced under the same conditions as Example 1, except that the position of the die was set at an angle α of 15 degrees (air gap: 50 mm).

There were traces of air entrapping on the cast film.

Comparative Example 2

A cast film was produced under the same conditions as Example 1, except that the magnesium content was made 120 ppm. The specific resistance of the resin upon melting was $3 \times 10^6$ Ω·cm.

Foreign matter of 50 μm or more were generated frequently.

Comparative Example 3

A cast film was produced under the same conditions as Example 1, except that the magnesium content was made 30 ppm. The specific resistance of the resin upon melting was $8 \times 10^8$ Ω·cm. There were traces of air entrapping on the cast film.

Setting Position of Die

By the comparison of Examples 1–4 with Comparative Example 1, it can be seen that the desirable position of the die is in the range from 30 to 90 degrees as the angle α, because air entrapping occurs, when the angle a is less than 30 degrees. A more desirable range is 45 to 60 degrees by considering the relation between the inhibition of air entrapping and air gap (film width).

Specific Resistance upon Melting

By the comparison of Examples 1, 4, 5 with Comparative Examples 2, 3, when the specific resistance is less than $5 \times 10^6$ Ω·cm, foreign agglomerates caused by the thermal degradation in the polyester film increase by the large quantity of a metal compound catalyst. Conversely, when the specific resistance is more than $3 \times 10^8$ Ω·cm, inhibition of air entrapping is insufficient, and accordingly, high speed casting cannot be achieved. A suitable specific resistance of the molten polyester resin is $5 \times 10^6$ to $3 \times 10^8$ Ω·cm, preferably $5 \times 10^6$ to $1 \times 10^8$ Ω·cm. Thereby, the generation of foreign matters in the polyester film is in the level of rare production troubles, and air entrapping can be inhibited up to the casting speed of 20 m/min.

Example 6

A cast film was produced under the same conditions as Example 1, except that the rotating speed of the cooling drum was changed to 5 m/min.

No air entrapping nor the generation of foreign matters of 50 μm or more did not occur at all.

The above cast film was stretched in the longitudinal direction under the following conditions to produce a longitudinally stretched film about 320 μm in thickness.

Gap between roll and heater in the first step: 20 mm
Gap between roll and heater in the second step: 20 mm
Gap between stretching rolls in the first step: 20 mm
Gap between stretching rolls in the second step: 20 mm
Draw ratio in the first step: 1.2 times
Cooling temperature after the first stretching: 100° C.
Draw ratio in the second step: 2.6 times
  Total draw ratio: 3.1 times The above. longitudinally stretched film was stretched laterally by a tenter at a draw ratio of 3.5 times under the following conditions to produce a biaxially stretched film 90 μm in thickness.

Lateral stretching temperature: 160° C.
Intermediate zone temperature: 200° C.
Intermediate zone passing time: 9 seconds
Heat setting temperature: 250° C.

Example 7

A longitudinally stretched film was produced under the same conditions as Example 6, except that the gap between the far infrared heater and the stretching roll was made 5 mm in the first step and the second step.

Example 8

A longitudinally stretched film was produced under the same conditions as Example 6, except that the gap between the far infrared heater and the stretching roll was made 40 mm in the first step and the second step.

Example 9

A longitudinally stretched film was produced under the same conditions as Example 6, except that the gap between the stretching rolls was made 3 mm in the first step and the second step.

Example 10

A longitudinally stretched film was produced under the same conditions as Example 6, except that the gap between the stretching rolls was made 40 mm in the first step and the second step.

Example 11

A longitudinally stretched film was produced under the same conditions as Example 6, except that the draw ratio in the first step was made 1.05 times. The total draw ratio in the longitudinal direction was 2.7 times.

Example 12

A longitudinally stretched film was produced under the same conditions as Example 6, except that the draw ratio in the first step was made 1.5 times. The total draw ratio in the longitudinal direction was 3.9 times.

Example 13

A longitudinally stretched film was produced under the same conditions as Example 6, except that the film cooling temperature after the first step stretching was made 120° C.

Example 14

A longitudinally stretched film was produced under the same conditions as Example 6, except that the draw ratio in the second step was made 2.1 times. The total draw ratio in the longitudinal direction was 2.5 times.

Example 15

A longitudinally stretched film was produced under the same conditions as Example 6, except that the draw ratio in the second step was made 3.25 times. The total draw ratio in the longitudinal direction was 3.9 times.

Comparative Example 4

A longitudinally stretched film was produced under the same conditions as Example 6, except that the gap between the far infrared heater and the stretching roll was made 50 mm in the first step.

Comparative Example 5

A longitudinally stretched film was produced under the same conditions as Example 6, except that the gap between the far infrared heater and the stretching roll was made 50 mm in the second step.

Comparative Example 6

A longitudinally stretched film was produced under the same conditions as Example 6, except that the gap between the far infrared heater and the stretching roll was made 4 mm in the first step. As a result, the film was partially fused and adhered to the roll surface to stop the line. Then, a sample could not be taken.

Comparative Example 7

A longitudinally stretched film was produced under the same conditions as Example 6, except that the gap between the stretching rolls was made 50 mm in the first step.

Comparative Example 8

A longitudinally stretched film was produced under the same conditions as Example 6, except that the gap between the stretching rolls was made 50 mm in the second step.

Comparative Example 9

A longitudinally stretched film was produced under the same conditions as Example 6, except that 2 mm in the first step. As a result, a part of the film surface was nipped between both rolls having a different rotating speed from each other to induce abrasion.

Comparative Example 10

A longitudinally stretched film was produced under the same conditions as Example 6, except that the draw ratio in the first step and in the second step was made 1.03 times and 3.0 times, respectively. The total draw ratio in the longitudinal direction was 3.1 times.

Comparative Example 11

A longitudinally stretched film was produced under the same conditions as Example 6, except that 1.6 times and 1.95 times, respectively. The total draw ratio in the longitudinal direction was 3.1 times.

Comparative Example 12

A longitudinally stretched film was produced under the same conditions as Example 6, except that the film cooling temperature after the first stetching was made 130° C.

Comparative Example 13

A longitudinally stretched film was produced under the same conditions as Example 6, except that the draw ratio in the second step was made 2.0 times. The total draw ratio in the longitudinal direction was 2.4 times.

Comparative Example 14

A longitudinally stretched film was produced under the same conditions as Example 6, except that the draw ratio in the second step was made 3.4 times. The total draw ratio in the longitudinal direction was 4.1 times.

Comparative Example 15

A longitudinally stretched film was produced under the same conditions as Example 6, except that the draw ratio in the lateral direction was made 2.9 times.

Comparative Example 16

A longitudinally stretched film was produced under the same conditions as Example 6, except that the draw ratio in the lateral direction was made 4.5 times.

The process conditions and the evaluations of the produced films in Examples 6–15 and Comparative Examples 4–16 are summarized in Table 1.

The glass transition temperature (Tg) was determined by sampling the biaxially stretched polyethylene-2,6-naphthalene dicarboxylate film, and measuring a differential scanning calorimeter ("DSC-50", Tsushima Seisaku-Sho), and found to be 120° C.

TABLE 1

| | Heater-Roll Gap | | Gap of Stretching Rolls | | Longitudinal Stretching | | | | Lateral Stretching | Uneven Thickness of Biaxially Stretched Film | Resistance to Cleavage | |
|---|---|---|---|---|---|---|---|---|---|---|---|---|
| | | | | | 1st Step Draw Ratio | Cooling Temp. after 1st Step | Total Draw Ratio | Uneven Thickness | Draw Ratio | | | |
| | 1st Step | 2nd Step | 1st Step | 2nd Step | | | | | | | MD | CD |
| Example 6 | 20 | 20 | 20 | 20 | 1.2 | 100 | 3.1 | 7.0 | 3.5 | 5.0 | ◉ | ◉ |
| Example 7 | 5 | 5 | 20 | 20 | 1.2 | 100 | 3.1 | 7.6 | 3.5 | 5.5 | ◉ | ◉ |
| Example 8 | 40 | 40 | 20 | 20 | 1.2 | 100 | 3.1 | 8.0 | 3.5 | 6.0 | ◉ | ◉ |
| Example 9 | 20 | 20 | 3 | 3 | 1.2 | 100 | 3.1 | 7.3 | 3.5 | 5.5 | ◉ | ◉ |
| Example 10 | 20 | 20 | 40 | 40 | 1.2 | 100 | 3.1 | 8.0 | 3.5 | 6.0 | ◉ | ◉ |
| Example 11 | 20 | 20 | 20 | 20 | 1.05 | 100 | 2.7 | 8.0 | 3.2 | 6.0 | ◉ | ◉ |
| Example 12 | 20 | 20 | 20 | 20 | 1.5 | 100 | 3.9 | 7.3 | 4.2 | 5.5 | ○ | ○ |
| Example 13 | 20 | 20 | 20 | 20 | 1.2 | 120 | 3.1 | 7.6 | 3.5 | 6.0 | ◉ | ◉ |
| Example 14 | 20 | 20 | 20 | 20 | 1.2 | 100 | 2.5 | 8.0 | 3.0 | 6.0 | ◉ | ◉ |
| Example 15 | 20 | 20 | 20 | 20 | 1.2 | 100 | 3.9 | 6.0 | 4.2 | 4.5 | ○ | ○ |
| Comparative 4 | 50 | 20 | 20 | 20 | 1.2 | 100 | 3.1 | 9.3 | 3.5 | 8.0 | ◉ | ◉ |
| Comparative 5 | 20 | 50 | 20 | 20 | 1.2 | 100 | 3.1 | 9.6 | 3.5 | 8.0 | ◉ | ◉ |
| Comparative 6 | 4 | 20 | 20 | 20 | — | — | — | — | — | — | — | — |
| Comparative 7 | 20 | 20 | 50 | 20 | 1.2 | 100 | 3.1 | 9.6 | 3.5 | 8.0 | ◉ | ◉ |
| Comparative 8 | 20 | 20 | 20 | 50 | 1.2 | 100 | 3.1 | 10.0 | 3.5 | 8.5 | ◉ | ◉ |
| Comparative 9 | 20 | 20 | 2 | 20 | — | — | — | — | — | — | — | — |
| Comparative 10 | 20 | 20 | 20 | 20 | 1.03 | 100 | 3.1 | 10.0 | 3.5 | 8.5 | ◉ | ◉ |
| Comparative 11 | 20 | 20 | 20 | 20 | 1.6 | 100 | 3.1 | 5.6 | 3.5 | 8.0 | ◉ | ◉ |
| Comparative 12 | 20 | 20 | 20 | 20 | 1.2 | 130 | 3.1 | 13.0 | 3.5 | 11.0 | ◉ | ◉ |
| Comparative 13 | 20 | 20 | 20 | 20 | 1.2 | 100 | 2.4 | 10.3 | 3.0 | 9.0 | ◉ | ◉ |
| Comparative 14 | 20 | 20 | 20 | 20 | 1.2 | 100 | 4.1 | 6.0 | 4.2 | 4.5 | Δ | ○ |
| Comparative 15 | 20 | 20 | 20 | 20 | 1.2 | 100 | 3.1 | 7.8 | 2.9 | 10.0 | ◉ | ◉ |
| Comparative 16 | 20 | 20 | 20 | 20 | 1.2 | 100 | 3.1 | 8.2 | 4.5 | 7.5 | ○ | Δ |

Total Longitudinal Draw Ratio =

1st Step Draw Ratio × 2nd Step Draw Ratio

Uneven Thickness of Longitudinally Stretched Film =

$$\frac{MaxThickness - MinThickness}{MeanThickness} \times 100$$

The maximum thickness, the minimum thickness and the mean thickness are in an interval of 30 m in the longitudinal direction. The data of Comparative Examples 6 and 9 were not present because sampling was impossible.

Uneven Thickness of Biaxially Stretched Film:

Evaluated by the same formula as the uneven thickness of the longitudinally stretched film as to each biaxially stretched film obtained by stretching laterally the longitudinally stretched film prepared in each longitudinal stretching conditions.

Lateral Draw Ratio:

Selected according to each longitudinal draw ratio by considering the balance between the longitudinal orientation and the lateral orientation after biaxial stretching.

Resistance to Cleavage:

Each biaxially stretched film was cut by an Elmendorf tearing tester (Toyo Seiki Seisaku-Sho, Ltd.), cleaving ability was evaluated in the longitudinal direction and the lateral direction.

⊚ . . . No occurrence of cleavage

○ . . . Cleavate Generation≦20%

Δ . . . Cleavate Generation>20%

Gap Between Far Infrared Heater and Roll

By the comparison of Examples 6–8 with Comparative Examples 4–6, it can be seen that when the gap between the bar infrared heater and the stretching roll (i.e. the distance between the far infrared heater and the film) is less than 5 mm, troubles occur, such as partial fusion of the film onto the roll surface. On the other hand, when the above gap exceeds 40 mm, heating efficiency at both side portions is degraded compared with the central portion of the film, and thereby, uneven elongation is made great (uneven thickness is made great.). A desirable gap is in the range of 5 to 40 mm, preferably 10 to 30 mm for decreasing the degree of uneven thickness and improving production stability.

Gap Between Stretching Rolls

By the comparison of Examples 6, 9, 10 and Comparative Examples 7–9, it can be seen that when the gap between the stretching rolls is less than 3 mm, production stability is degraded by the occurrence of abrasion by nipping the film between both stretching rolls having a different rotating speed from each other or the like. On the other hand, when the gap between the stretching rolls exceeds 40 mm, the distance of the film not contacting a stretching roll is long to induce waving on both sides caused by the increase of neck-in upon stretching, and uneven elongation increases (uneven thickness is degraded.). A desirable gap is in the range of 3 to 40 mm, preferably 10 to 30 mm for decreasing the degree of uneven thickness and improving production stability.

Longitudinal Draw Ratio in First Step

By the comparison of Examples 6, 11, 12 with Comparative Examples 10, 11, it can be seen that when the draw ratio in the first step is less than 1.05, effects exhibited by dividing the longitudinal stretching into two steps are small to increase uneven thickness. On the other hand, when the draw ratio exceeds 1.5 times, uneven thickness is already great in the first step stretching. A desirable draw ratio is 1.05 to 1.5 times, preferably 1.1 to 1.3 times for decreasing the degree of uneven thickness.

Film Cooling Temperature After First Step Stretching

By the comparison of Examples 6, 13 with Comparative Example 12, it can be seen, that when the film cooling temperature, uneven elongation occurs during traveling the film from the cooling stretching roll in the first step to the heating stretching roll in the second step to increase uneven thickness. Accordingly, it is desirable that the film cooling temperature after the first step stretching is the glass transition temperature or lower than that.

Total Longitudinal Draw Ratio

By the comparison of Examples 6, 14, 15 with Comparative Examples 13, 14, it can be seen that when the total draw ratio in the longitudinal direction is less than 2.5 times, uneven thickness is great. When the total draw ratio exceeds 3.9 times, the polyester film tends to cleave. A desirable total draw ratio in the longitudinal direction is 2.5 to 3.9 times.

Lateral Draw Ratio

A suitable draw ratio in the lateral direction depends on the balance of orientation, and is set according to the draw ratio in the longitudinal direction. By the comparison of Examples 6, 14, 15 with Comparative Examples 15, 16, it can be seen that when the draw ratio in the lateral direction is less than 3.0 times, uneven thickness is great. When the draw ratio exceeds 4.2 times, the film tends to cleave. In the above total draw ratio in the longitudinal direction, a desirable draw ratio in the lateral direction is 3.0 to 4.2 times.

Example 16

A biaxially stretched film 90 μm in thickness was produced under the same conditions as Example 6, except that the lateral stretching temperature was made 120° C.

Example 17

A biaxially stretched film 90 μm in thickness was produced under the same conditions as Example 6, except that the lateral stretching temperature was made 170° C.

Example 18

A biaxially stretched film 90 μm in thickness was produced under the same conditions as Example 6, except that the intermediate zone temperature was made 180° C.

Example 19

A biaxially stretched film 90 μm in thickness was produced under the same conditions as Example 6, except that the intermediate zone temperature was made 230° C.

Example 20

A biaxially stretched film 90 μm in thickness was produced under the same conditions as Example 6, except that the traveling speed was made 3 times. As a result, the passing time of the film through the intermediate zones was three seconds.

Example 21

A biaxially stretched film 90 μm in thickness was produced under the same conditions as Example 6, except that the length of the intermediate zones was made 3.3 times. As a result, the passing time of the film through the intermediate zones was 30 seconds.

Example 22

A biaxially stretched film 90 μm in thickness was produced under the same conditions as Example 21, except that the traveling speed was made 4 times. As a result, the passing time of the film through the intermediate zones was 7.5 seconds.

Example 23

A biaxially stretched film 90 μm in thickness was produced under the same conditions as Example 6, except that the heat setting temperature was made 238° C.

Example 24

A biaxially stretched film 90 μm in thickness was produced under the same conditions as Example 6, except that the heat setting temperature was made 263° C.

Comparative Example 17

A biaxially stretched film was tried to produce under the same conditions as Example 6, except that the lateral stretching temperature was made 110° C. As a result, film rupture occurred frequently, and a sample of biaxially stretched film could not be obtained.

Comparative Example 18

A biaxially stretched film was tried to produce under the same conditions as Example 6, except that the lateral stretching temperature was made 180° C. As a result, uneven elongation occurred greatly in the lateral direction, and a sample of biaxially stretched film could not be obtained.

Comparative Example 19

A biaxially stretched film 90 μm in thickness was produced under the same conditions as Example 6, except that the intermediate zone temperature was made 170° C.

Comparative Example 20

A biaxially stretched film 90 μm in thickness was produced under the same conditions as Example 6, except that the intermediate zone temperature was made 240° C.

Comparative Example 21

A biaxially stretched film 90 μm in thickness was produced under the same conditions as Example 6, except that the traveling speed was made 4 times. As a result, the passing time of the film through the intermediate zones was 2.25 seconds.

Comparative Example 22

A biaxially stretched film 90 μm in thickness was produced under the same conditions as Example 6, except that the length of the intermediate zone was made ¼ time. As a result, the passing time of the film through the intermediate zones was 2.25 seconds.

Comparative Example 23

A biaxially stretched film 90 μm in thickness was produced under the same conditions as Example 6, except that the heat setting temperature was made 230° C.

Comparative Example 24

In Example 6, then the heat setting temperature was made 265° C., sagging occurred at the central portion of the film, and abrasion was generated by the contact with an apparatus in the tenter.

The process conditions and the evaluations of the produced films in Examples 16–24 and Comparative Examples 17–24 are summarized in Table 2. In the table, no date is indicated as to Comparative Examples 17, 18 and 24, because a sample could not be taken. In the other films, surface defects, such as abrasion, were not generated.

TABLE 2

|  | Lateral Stretching Temp. (° C.) | Intermediate Zone Temp. (° C.) | Intermediate Zone Passing Time (min.) | Heat Setting Temp. (° C.) | Bowing (%) | Uneven Thickness of Biaxially Stretched Film (%) | Resistance to Cleavage |
|---|---|---|---|---|---|---|---|
| Example 6 | 160 | 200 | 9.0 | 250 | 6.3 | 6.0 | ⊚ |
| Example 16 | 120 | 200 | 9.0 | 250 | 7.0 | 7.0 | ⊚ |
| Example 17 | 170 | 200 | 9.0 | 250 | 6.7 | 8.0 | ⊚ |
| Example 18 | 160 | 180 | 9.0 | 250 | 6.7 | 6.0 | ⊚ |
| Example 19 | 160 | 230 | 9.0 | 250 | 7.3 | 6.0 | ⊚ |
| Example 20 | 160 | 200 | 3.0 | 250 | 7.3 | 5.5 | ⊚ |
| Example 21 | 160 | 200 | 30.0 | 250 | 6.0 | 6.5 | ⊚ |
| Example 22 | 160 | 200 | 7.5 | 250 | 6.3 | 6.0 | ⊚ |
| Example 23 | 160 | 200 | 9.0 | 238 | 6.3 | 6.0 | ○ |
| Example 24 | 160 | 200 | 9.0 | 263 | 6.3 | 6.0 | ⊚ |
| Comparative 17 | 110 | — | — | — | — | — | — |
| Comparative 18 | 180 | — | — | — | — | — | — |
| Comparative 19 | 160 | 170 | 9.0 | 250 | 9.3 | 6.0 | ⊚ |
| Comparative 20 | 160 | 240 | 9.0 | 250 | 9.6 | 6.0 | ⊚ |
| Comparative 21 | 160 | 200 | 2.25 | 250 | 10.5 | 7.0 | ⊚ |
| Comparative 22 | 160 | 200 | 2.25 | 250 | 10.0 | 7.5 | ⊚ |
| Comparative 23 | 160 | 200 | 9.0 | 230 | 6.0 | 5.5 | Δ |
| Comparative 24 | 160 | 200 | 9.0 | 265 | — | — | — |

After biaxial stretching, a sample of polyethylene-2,6-naphthalene dicarboxylate film was taken, and temperature relations were measured by a differential scanning calorimeter ("DSC-50", Shimazu Seisaku-Sho) to obtain the following results.

Glass transition temperature (Tg): 120° C.

Temperature descending crystallization Temperature (Tc): 200° C.

Melting point: 268° C.

Intermediate Zone Passing Time (sec) =

$$\frac{\text{Length of Intermediate Zone (m)}}{\text{Traveling Speed (m/min)}} \times 60$$

Bowing (%)=C/W×100

Figure 6:
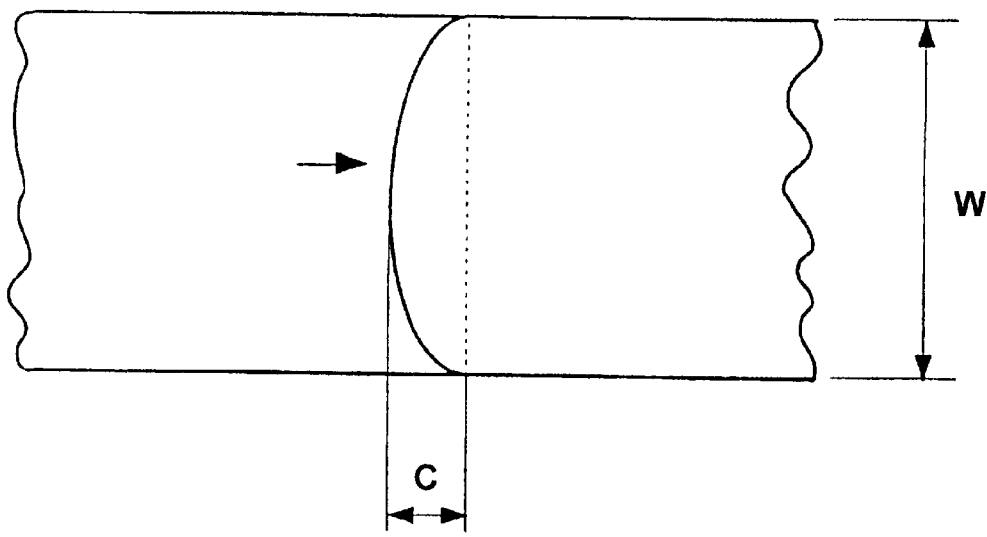
FIG. 6 is a plan view illustrating the bowing phenomenon.

W is the width of the film and C is the degree of the deformation at the center of the film in the traveling direction, as shown in FIG. 6. The film measured had a width of 1200 mm.

Uneven thickness of Biaxially Stretched Film:

Evaluated by the same formula as mentioned previously. The maximum thickness and the minimum thickness were as in the width direction.

Resistance to Cleavage:

Each biaxially stretched film was cut by an Elmendorf tearing tester (Toyo Seiki Seisaku-Sho, Ltd.), cleaving ability was evaluated in the longitudinal direction and the lateral direction.
⊚ . . . No occurrence of cleavage
○ . . . Cleavate Generation≦20%
△ . . . Cleavate Generation>20%

Lateral Stretching Temperature

By the comparison of Examples 6, 16, 17 with Comparative Examples 17, 18, it can be seen that when the stretching temperature in the lateral direction is lower than the glass transition temperature, film rupture occurs during stretching. On the other hand, when the stretching temperature exceeds the glass transition temperature +50° C., uneven elongation occurs in the film width direction. A desirable lateral stretching temperature is in the range from the glass transition temperature (Tg) to the glass transition temperature (Tg) +50° C., preferably Tg +25° C. to Tg +45° C., for decreasing the uneven thickness in the width direction.

Intermediate Zone Temperature

By the comparison of Examples 6, 18, 19 with Comparative Examples 19, 20, it can be seen that when the intermediate zone temperature is less than the lateral stretching temperature +20° C., the relaxation of strain energy of molecules accumulated in the film upon finishing lateral stretching is small. As a result, shrinkage stress of the polyester film works strongly on the central portion which is not fixed by clips in the heat setting zones to induce the bowing phenomenon greatly. On the other hand, when the intermediate zone temperature exceeds the heat setting temperature −20° C., heat shrinkage occurs at the intermediate zones to shrink at the central portion which is not fixed by clips to induce the bowing phenomenon greatly. A desirable intermediate zoned temperature is in the range from the lateral stretching temperature +20° C. to the heat setting temperature −20° C., preferably the temperature descending crystallization temperature ±20° C. By keeping the intermediate zone temperature in the range of the temperature descending crystallization temperature ±20° C., the balance between the relaxation of strain energy of molecules accumulated in the film upon finishing lateral stretching and the thermal shrinkage at the central portion of the film which is not fixed by clips becomes more preferable for the inhibition of bowing phenomenon to decrease the degree of bowing phenomenon.

Intermediate Zone Passing Time

By the comparison of examples 6, 20, 21 with Comparative Examples 21, 22, it can be seen that when the passing time of the intermediate zones has no less than 3 seconds, the relaxation of strain energy of molecules accumulated in the film upon finishing lateral stretching is small. As a result, shrinkage stress of the polyester film works strongly on the central portion which is not fixed by clips in the heat setting zones to induce the bowing phenomenon greatly. On the other hand, a long passing time influences small on the performance of the polyester film. However, long intermediate zone increases equipment cost. A desirable passing time is in the range from 3 seconds to 30 seconds.

Heat Setting Temperature

By the comparison of Examples 6, 23, 24 with Comparative Examples 23, 24, it can be seen that when the heat setting temperature is lower than Tm −30° C., the polyester film is liable to cleave. As a result, the polyester film is broken in the subsequent processes for processing it as the support for a photographic film. On the other hand, when the heat setting temperature exceeds Tm −5° C., partial sagging occurs during conveying to induce abrasions. A desirable heat setting temperature is in the range from Tm −30° C. to Tm −5° C.

What is claimed is:

1. A method of producing a biaxially stretched polyester film which comprises casting a polyester cast film by extruding a molten polyester resin onto a cooling drum through a die while static electricity is applied to the extruded molten polyester resin, stretching the cast film in the longitudinal direction by stretching rolls, stretching the longitudinally stretched cast film in the lateral direction by a tenter, and heat setting the biaxially stretched cast film, wherein said molten polyester resin having been adjusted so as to have a specific resistance of $5 \times 10^6$ to $3 \times 10^8$ Ωcm, said die being positioned so that the line connecting the center of the cooling drum and the intersection of the vertical line passing the die lip with the circumferential surface of the cooling drum has an angle of 30 to 90 degrees against the vertical line passing the center of the drum, said stretching in the longitudinal direction comprising a first longitudinal stretching and a second longitudinal stretching, each with heating by a far infrared heater, wherein stretching rolls in each stretching are located with a gap of 3 to 40 mm, and each far infrared heater is located with a gap of 5 to 40 mm from the circumferential surface of the stretching roll, wherein the cast film being stretched at a draw ratio of 1.05 to 1.5 times in the first longitudinal stretching, being cooled to glass transition temperature or lower, and then being stretched again so that the total draw ratio becomes 2.5 to 3.9 times in the second longitudinal stretching, said stretching in the lateral direction being carried out at a temperature in the range from glass transition temperature to the glass transition temperature +50° C., passing the laterally stretched cast film through an intermediate zone kept at said temperature in the range from glass transition temperature to the glass transition temperature +50° C. at the end of the lateral stretching +20° C. to the maximum temperature of the surface of the cast film in the tenter −20° C. for 3 to 30 seconds, and said heat setting being carried out at a temperature from melting point −30° C. to melting point −5° C.

2. The method of claim 1, wherein said polyester is polyethylene-2,6-naphthalene dicarboxylate.

3. The method of claim 1, wherein a metal compound catalyst which is an ester exchange reaction catalyst, is used in the production of the polyester resin and wherein the specific resistance is adjusted by controlling the blending amount of the metal compound catalyst.

4. The method of claim 1, wherein said intermediate zone is kept at a temperature of a temperature descending crystallization temperature ±20° C.

5. The method of claim 1, wherein said stretching in the lateral direction is at a draw ratio of 3.0 to 4.2 times.

6. The method of claim 1, wherein said biaxially stretched polyester film has resistance cleavage, small uneven thickness, and small bowing phenomenon.

* * * * *